C. H. GAUNT.
METHOD OF PRODUCING UNIDIRECTIONAL ELECTRIC SPARKS FROM ALTERNATING CURRENT.
APPLICATION FILED MAY 18, 1914.
1,196,452. Patented Aug. 29, 1916.
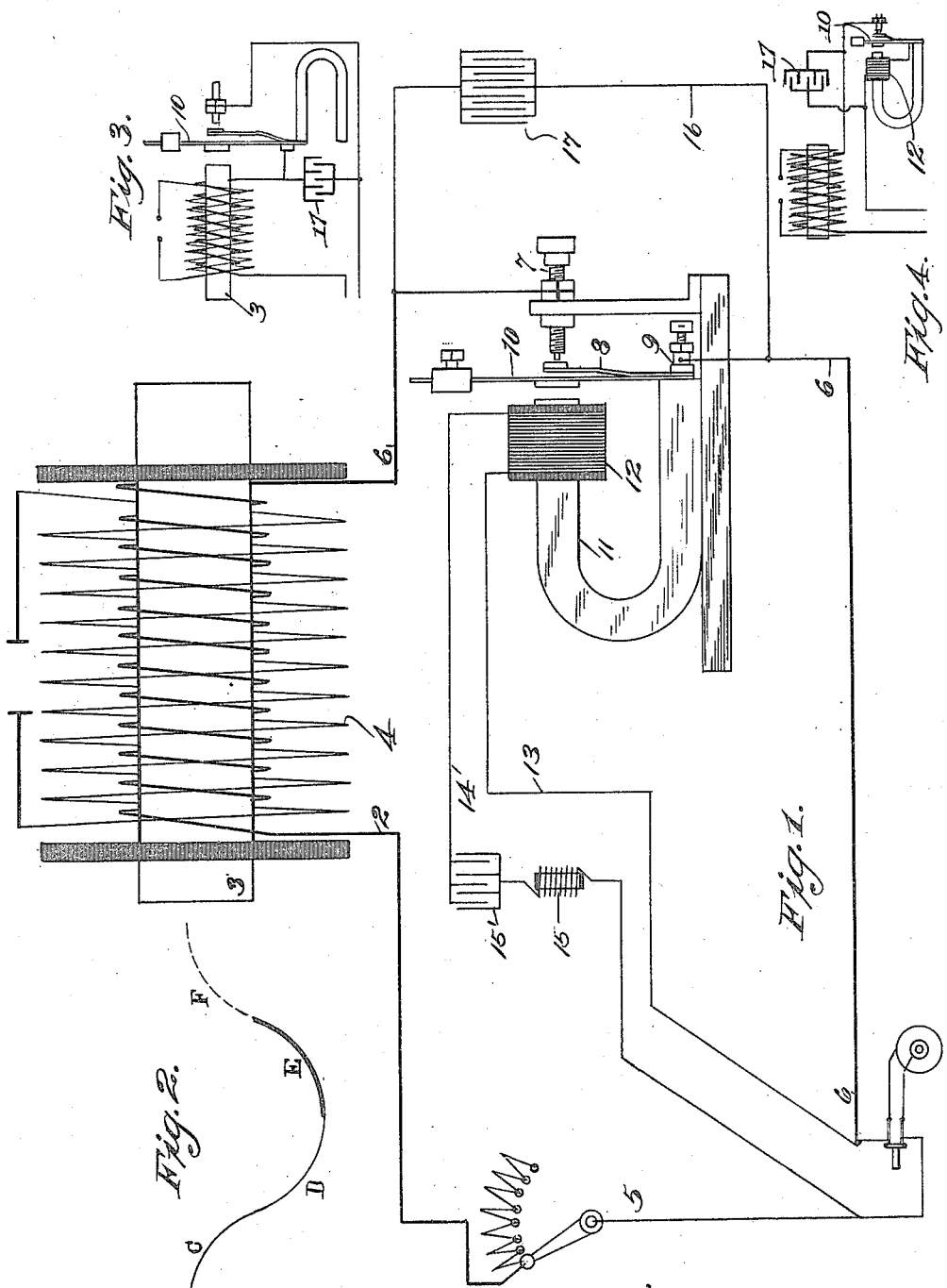
WITNESSES:
INVENTOR
Charles H. Gaunt.
BY G. H. Strong.
ATTORNEY

UNITED STATES PATENT OFFICE.

CHARLES H. GAUNT, OF SAN FRANCISCO, CALIFORNIA.

METHOD OF PRODUCING UNIDIRECTIONAL ELECTRIC SPARKS FROM ALTERNATING CURRENT.

1,196,452. Specification of Letters Patent. Patented Aug. 29, 1916.

Application filed May 13, 1914. Serial No. 839,281.

*To all whom it may concern:*

Be it known that I, CHARLES H. GAUNT, a citizen of the United States, residing in the city and county of San Francisco and State of California, have invented new and useful Improvements in Methods of Producing Unidirectional Electric Sparks from Alternating Current, of which the following is a specification.

This invention relates to a method of producing unidirectional electric sparks from an alternating current.

The object of this invention is to produce unidirectional impulses or spark currents of high electromotive force in the secondary of a Ruhmkorff coil or other induction apparatus, utilizing alternating current as the exciting force in the primary; and the invention is particularly adapted for use in X-ray and wireless operations.

As is well known, a sudden decrease in the flux of the primary of an induction coil induces a current in the secondary flowing in the same direction as the energizing current in the primary, whereas, a sudden increase in the flux of the primary induces a current of reverse order in the secondary, provided the sinuosity of the windings be the same, and vice versa if the windings be opposed. Hence, if the initial energizing current in the primary be of a plus character, for instance, and the flux therefrom be suddenly collapsed the induced current in the secondary will, likewise, be plus; and if the demagnetized primary be suddenly re-energized with a minus current the increasing flux will create an opposite or plus current in the secondary, thus maintaining unidirectional impulses in the secondary induced by an alternating current in the primary.

In carrying out this invention, I employ an induction coil or similar spark producing apparatus having its primary connected with a source of alternating current. The circuit comprises an interrupter which is bridged by a condenser, the latter being in series with the primary. In operation, current waves of one direction, say, plus, passing through the primary, are interrupted approximately at the moment of their maximum force and the resulting current in the primary, comprising the current from the source and the current due to self-induction, is caused to pass into the condenser and highly charge the same. The condenser and the frequency are so chosen that the discharge of the condenser will occur when the current in the line due to the source has reversed and become minus, the result being that the total reverse or minus current now passing through the primary will be in measure with the potential of the source plus the potential attained in the condenser. Shortly after the minus wave from the source has passed its maximum the circuit is closed at the interrupter for the purpose of reinforcing the energy in the primary coil and preventing a sudden decrease of the minus current wave, thereby maintaining for a longer time the opposite or plus current in the secondary and prolonging the duration of the spark. The spark then dies out as the current in the primary changes from minus to plus, and the above sequence is repeated. While it is possible to obtain a separate spark for each making and breaking of the circuit through the primary, I prefer to adjust the condenser in such a way that it will have a capacity to receive an extremely large potential following the breaking of the primary circuit, and to delay the discharge of the condenser until such time as the charging wave has reached zero, and after the reverse wave occurs, in which latter case the discharge of the condenser will be boosted by the reversal of current in the supply mains. The discharge from the condenser, being of much greater potential than the magnetism in the primary coil, obviously, a quick demagnetization of the latter will take place, resulting in the induction of a spark current in the secondary. Not only will the primary be demagnetized thereby, but a remagnetization with an opposite current will occur, causing a rising flux which will induce the same direction of current in the secondary as the falling oppositely charged flux. Also, coincident with the remagnetization of the primary from the condenser discharge will occur the closing of the primary circuit after the crest of the minus wave is reached, which will further increase the flux of the primary, inducing a current in the secondary of the right direction to follow in on the initial spark current, thus prolonging and maintaining the spark and thereby forming in effect a single one-way spark of considerable length and thickness from the oppositely flowing currents in the primary.

In induction apparatus in which a direct current is utilized for the energization of the primary, the persistence and continuity of the direction of flow of the direct current from its initial source counteracts the favorable demagnetizing effect of the reverse or resurging current from the condenser, and this persistence is contributed to by the arcs formed at the separation of points of contact of a circuit breaker, and, therefore, the demagnetization of the core of the inductor is in such cases slow and incomplete; whereas, by the provision of my means for selecting waves of one direction of alternating electromotive current for the initial magnetization of the primary and the combination of the opposite wave of the alternating current with the reverse or resurge current from the condenser for the complete and sudden demagnetization and opposite remagnetization of the same, not only is the maximum energy of the alternating current utilized to produce unidirectional discharges but the natural reaction of the condenser is assisted in the change of magnetization of the core, so that on the start of the next selected unidirectional alternation of the initial magnetizing current, the primary will be practically free of residual magnetism and the maximum efficiency of the coil utilized.

Several devices for carrying out the object of my invention are exemplified in the following description and illustrated in the accompanying drawings, in which—

Figure 1 is a diagrammatic view, showing one embodiment of elements of the invention. Fig. 2 is a diagram, showing the curve of alternating current. Fig. 3 shows a modification of the induction coil, in which the polarized interrupter is mounted for operation by the magnetic force of the core of the coil, the associated parts being omitted. Fig. 4 is a detail modification of the induction coil, showing an arrangement in which the electromagnetic coil of the interrupter is connected in series with the primary coil.

For the ready comprehension of the operation of this apparatus, reference is made to the chart, Fig. 2, in which the curve represents graphically one cycle of an alternating electromotive force. The first dark section B is the rising force of a wave of one sign or direction, say, plus; the following light section C is the falling force of the same sign or direction. Below the zero is a light section D of a wave of opposite sign or direction, say, minus, rising in force to the crest and falling in the dark section E. This apparatus may utilize and operate with waves of either sign, and in the present case may be considered as selecting the rising positive wave to initially excite the coil, prior to the break.

In the apparatus shown, 2 is the primary winding of an induction coil; 3 is the core; and 4 is the secondary coil. The primary winding is connected to a service wire 5 and a return wire 6; the latter being connected to a suitable adjustable contact device, shown as a screw 7, engageable by a resilient contact member 8. The latter is electrically connected to a binding post 9, and mechanically connected to and carried by a vibrator 10 in the form of an armature, forming a part of a polarized interrupter; the opposite pole from the armature 10 being indicated by a permanent magnet 11, to which one end of the vibrating armature 10 is connected. From the binding post 9 return service wire 6 is extended for electrical connection with a source of supply. The polarized vibrator 10 is tuned to move with a natural rate of vibration in periodicity approximating the frequency of alternations or oscillations of the alternating current forming the electromotive force of the apparatus, and operates to select unidirectional waves which may be of either sign, as desired. The permanent magnet 11 is shown as wound by a coil 12, which is energized through suitable connecting wires 13—14 connected to the service wires 5—6, so that the electromagnet coil 12 is in shunt with the primary coil 2 of the inductor.

In Fig. 3, the armature 10 is disposed in the field of the core 3, and in Fig. 4 the coil 12 is shown as connected in series with the primary coil of the inductor.

Introduced at a suitable point in the apparatus is a means for controlling the time of opening of the wave-selecting interrupter, or, in other words, the breaking of the circuit at the contact members 7—8. The retarder or timer is shown in the present instance as comprising an inductive coil 15 and a condenser 15', both or either of which may be introduced in the interrupter electromagnet circuit, although it is understood that any other suitable device for retarding or controlling the flow of current to the electromagnet coil 12 may be utilized. The purpose of the retarder or timer is to so control the energization of the coil 12 of the interrupter that the latter will be operated at a time when the selected charging wave of the alternating current is at its maximum or crest, so that the circuit of the primary coil 2 will be interrupted when the plus wave is at its maximum and made when the minus wave has passed its crest.

When the interrupter is tuned to oscillate in synchronism with the oscillations of the alternating current, and with the electromagnet coil 12 controlled so as to open or break the circuit through movement of the armature 10 at the instant of maximum force in the feed wires (allowing for lag), the inductor will be charged to its highest and the core 3 magnetized proportionately.

Connected across the terminals of the interrupter there is a wire 16, in which is mounted a primary condenser 17 of suitable type. After the breaking of the exciting circuit of the induction coil 2 there occurs a reverse wave or current discharge from the condenser 17, and this discharge from the condenser acts through the primary coil 2 in an opposite direction to the flow of energizing electromotive force and tends to demagnetize the core of the inductor. Although a condenser in a spark producing apparatus or induction coil which is actuated by direct current reacts not only with the normal potential derived from the line, but with the additional force derived from self-induction, and at the moment of break by the interrupter the condenser is heavily charged with the positive current, yet its reacting or discharge wave is counteracted to a certain extent in its demagnetizing effect upon the core by the opposing electromotive force in the line.

In operation, the selective interrupter closes the primary circuit after the crest of the negative wave D—E is reached, Fig. 2, and the circuit remains closed until the crest of the rising plus wave is reached; whereupon the polarized armature is actuated to break the circuit. The condenser is thus highly charged with a positive wave, and afterward discharges a reverse or negative wave, which discharge may be delayed, by adjustment, to occur at the time the falling wave C has reached zero, and the wave D begins. Plainly, the falling positive wave offers no resistance to the condenser discharge and the negative wave, if present, will serve to assist its discharge. The potential of the current carried into and discharged by the condenser may easily amount to several hundred volts where a 110 volt service is employed, the excess being created by self induction in the primary, as is well known. Therefore, the discharge of the condenser acting against the retained magnetism in the primary not only causes a sudden and complete collapse of the flux, but recharges the primary in an opposite direction. By suddenly changing the magnetization of the core a plus current is induced in the secondary which creates a spark of one direction, and thereafter the interrupter swings back and closes the primary circuit and short circuits the condenser; this occurring after the crest of the reverse alternation is reached and also after the maximum flux due to the condenser discharge. The negative wave force, by following up the condenser discharge, further increases the flux of the primary and maintains the spark current in the secondary. Even though not sufficient in itself to produce a spark, this latter current will follow in on the initial spark current, once the air is broken down, and serve to maintain the strength and life of the spark until the negative wave dies out. Thereafter the next positive wave force starts, the interrupter still being closed and the condenser short-circuited through the contacts 7 and 8. The rising flux created by the positive current wave, being a gradual one, will of course, induce no current in the secondary sufficient to cause a spark.

By delaying the discharge of the condenser until such time as the reverse alternation in the current waves occurs, the potential of the condenser is increased in proportion to the length of time the rising reverse wave is permitted to enter it. Hence, I prefer to adjust the capacity of the condenser in such a way as to benefit by the full force of the negative wave in boosting the discharge of the condenser, so that in addition to combining in the condenser the initial potential of the energizing current and the self-induced currents from the primary, I add in series therewith the full strength of the reverse alternation in the current line to thereby raise the potential of the condenser to greatly increased value, and thus insure the sudden demagnetization and quick opposite remagnetization of the primary. This, of course, necessitates also a delay in the closing of the interrupter beyond the point where the negative current wave has reached its maximum value, as, otherwise, the greatest force of the reverse alternation would pass directly into the primary and fail to act in series with the condenser discharge.

The advantages of my improved method of producing high potential spark currents over methods heretofore in use are to be found chiefly in the capability of the apparatus to connect up directly with ordinary electric supply mains delivering alternating current of the usual voltage for commercial purposes and the increased efficiency made possible by utilizing the combined potentials of both current waves plus that of self-induction to collapse and reform the lines of force surrounding the secondary in quick and successive order, whereby a small twelve-inch coil is made to deliver sparks, the equivalent in size and force to those produced by ordinary coils of twice that measurement.

It will, of course, be understood that other means than those described may be employed in carrying out my invention without departing from the spirit thereof as disclosed in the appended claims.

Having thus described my invention, what I claim and desire to secure by Letters Patent is—

1. The method of producing unidirectional sparks from an alternating current, which comprises passing an alternating current through the primary coil of an induction apparatus, breaking the circuit in the primary coil at or near the crest of waves of one sign, causing the self-induced current in the primary coil to charge a condenser, allowing the condenser to discharge back into the primary coil, and closing said circuit at or near the crest of waves of the opposite sign.

2. The method of producing unidirectional sparks from alternating current, which consists in initially charging the primary coil of a spark producing apparatus with unidirectional impulses of an alternating current, and combining the impulses of opposite direction with the charge of a primary condenser to demagnetize and reënergize in opposite direction the primary coil in quick succession.

3. The process of producing a high electromotive force in the secondary coil of an induction apparatus which comprises passing a current of one sign through the primary coil, interrupting the current at about the crest of the current wave, causing a condenser to be charged by the self-induction of the primary circuit when the current in the latter is interrupted, and causing the condenser to discharge through the primary coil when an electromotive force of oppposite sign is present in said primary coil.

4. The process of producing a high electromotive force in the secondary coil of an induction apparatus which comprises charging the primary coil from a source of alternating current, breaking the circuit at about the crest of a current wave, causing a condenser to be charged by current due to the electromotive force of the source just subsequent to the break and by the self-induction arising in the primary circuit, and causing the condenser to discharge through the primary coil when the electromotive force therein has been reduced.

5. The process of producing a high electromotive force in the secondary coil of an induction apparatus which comprises charging the primary coil from a source of alternating current, breaking the circuit at about the crest of a current wave of one sign, causing a condenser to be charged by current due to the electromotive force of the source just subsequent to the break and by the self-induction arising in the primary circuit, and causing the condenser to discharge through the primary coil when the electromotive force from the source in the primary circuit is of the opposite sign.

6. The process of producing a high electromotive force in the secondary coil of an induction apparatus which comprises causing the flux in the primary due to current of one sign from a source of alternating current to suddenly decrease and then suddenly increasing the flux by passing through the primary a current of opposite sign resulting from an electromotive force approximately equal to the sum of the maximum electromotive force of the source and the electromotive force of the self-induction in the primary circuit caused by the sudden decrease in flux.

7. The process of producing a high electromotive force in the secondary coil of an induction apparatus having a condenser in series with the primary coil, which comprises energizing the primary coil from a source of alternating current through a circuit shunting said condenser, breaking the shunt at about the crest of a current wave of one sign and closing the shunt after the crest of a current wave of opposite sign.

8. The process of producing a high electromotive force in the secondary coil of an induction apparatus having a condenser in series with the primary coil, which comprises energizing the primary coil from a source of alternating current through a circuit shunting said condenser, breaking the shunt at about the crest of a current wave of one sign thereby producing a current of self-induction to charge the condenser, closing the shunt shortly after the crest of a wave of opposite sign, and maintaining such a relation between the time of discharge of the condenser and the frequency of the alternating current that said discharge is reinforced by the electromotive force of said source.

9. The process of producing a high electromotive force in the secondary coil of an induction apparatus having a condenser in series with the primary coil, which comprises energizing the primary coil from a source of alternating current through a circuit shunting said condenser, breaking the shunt at about the crest of a current wave of one sign thereby producing a current of self-induction to charge the condenser, closing the shunt shortly after the crest of a wave of opposite sign, and maintaining such a relation between the time of discharge of the condenser and the frequency of the alternating current that said discharge is reinforced by about the maximum electromotive force of said source.

10. The method of producing unidirectional sparks from alternating current, which consists in selecting current waves of one sign; passing them through the primary coil of a spark-producing apparatus; breaking the circuit therethrough when said current waves are at or near their maximum value; causing a condenser in connection with said primary coil to be charged at the breaking of said circuit by the current potential in the line and the self-induced currents in the primary coil causing the condenser to discharge to demagnetize the primary coil and reënergize said primary in the opposite direction, whereby a spark current of one direction is induced in the secondary coil of said apparatus, and then closing the circuit through said primary when the opposite current waves are present to supplement the condenser discharge in the re-magnetization of said primary coil and induce a follow-up spark current in the secondary of the same direction as before.

In testimony whereof I have hereunto set my hand in the presence of two subscribing witnesses.

CHARLES H. GAUNT.

Witnesses:
 F. E. MAYNARD,
 J. G. DICKIE.